United States Patent [19]
Radmall

[11] Patent Number: 5,662,209
[45] Date of Patent: Sep. 2, 1997

[54] REVERSIBLE, PORTABLE CONVEYOR SYSTEM

[75] Inventor: Paul Radmall, Gloucestershire, United Kingdom

[73] Assignee: Rako Products Limited, United Kingdom

[21] Appl. No.: 411,680

[22] PCT Filed: Oct. 6, 1993

[86] PCT No.: PCT/GB93/02077

§ 371 Date: May 30, 1995

§ 102(e) Date: May 30, 1995

[87] PCT Pub. No.: WO94/07781

PCT Pub. Date: Apr. 14, 1994

[30] Foreign Application Priority Data

Oct. 6, 1992 [GB] United Kingdom ................ 9220961

[51] Int. Cl.$^6$ ............................................... B65G 43/10
[52] U.S. Cl. ........................................ 198/575; 198/577
[58] Field of Search ................................. 198/575, 577

[56] References Cited

U.S. PATENT DOCUMENTS 2,788,134  4/1957  Miller et al. ............................ 198/577
5,058,727  10/1991  Jahns et al. ............................ 198/577

OTHER PUBLICATIONS

Roberts, Controlling Belt Conveyors, Feb. 1950.

Koto, Su, Rock Transporting Conveyor System Drive . . . , 1992, Derwent Publications Ltd.

Primary Examiner—William E. Terrell
Assistant Examiner—Khoi H. Tran
Attorney, Agent, or Firm—Baker & Botts, L.L.P.

[57] ABSTRACT

The invention is directed to a conveying system comprising a plurality of portable conveyor units which may be arranged serially to form a conveyor feed path. Each conveyor unit includes a plurality of rollers, one of which is associated with an electric motor for supplying power to the conveyor, and a pair of quick-release electrical connectors. One of the electrical connectors is designed to receive an electrical cable from a preceding conveyor while the other electrical connector is designed to have an electrical cable extending between it and an electrical connector on a succeeding conveyor. The electrical connectors supply power to the electric motor. Depending on which electrical connector of the pair of electrical connectors serves as the inlet to electrical current, the direction of conveyor may be reversed.

6 Claims, 4 Drawing Sheets

REVERSIBLE, PORTABLE CONVEYOR SYSTEM

TECHNICAL FIELD

This invention relates to a belt-type continuous conveyor and a conveying system comprising a plurality of similar conveyors.

DISCLOSURE OF THE INVENTION

It is usual practice with all small scale building work, both professional and DIY, to move materials around in buckets and wheel barrows, even though this is laborious, slow and sometimes inconvenient. It is also known to use dump trucks and cranes, but these are not always practical or convenient. One object of the present invention is to provide a practical alternative to the known equipment.

According to one aspect, the invention consists in a conveying system comprising a plurality of conveyor units each comprising a frame supporting a roller at each end over which a conveyor belt passes, at least one of the rollers being driven by an electric motor, and the motors of successive conveyor units when arranged in a feed path being interconnected so that they are powered and controlled in a common power circuit.

Preferably, each motor is reversible and its sense of rotation is selectively controlled by the manner in which it is connected in the power circuit. For example, each unit is fitted with at least two input/output sockets which are interconnected such that the sense of rotation of the motor can be changed by connecting the power supply to either socket. The unused socket can then serve as the power supply socket for the next unit in the system and can be connected to it by suitable cable and plug means. The complete conveyor system can thus be laid out initially to suit the application without regard to the direction of movement of the conveyor belts, and the direction of the belts can be selected appropriately in a separate operation when inter-connecting the motors in the power circuit.

Preferably, a safety circuit is incorporated within each cable and plug means and/or socket such that if either is short-circuited or broken, the power is interrupted at the power source, stopping the conveyor system and making it electrically safe. The last input/output socket is fitted with a termination plug which protects the socket and contains additional safety circuit components.

The frame preferably consists of an elongated box-section structure which is filled with a rigid structural foam that increases the strength of the structure and serves to encapsulate the power circuit components within the frame, the foam being injected during the manufacturing process.

A suitable box-section structure preferably comprises side wall members joined by upper and lower bed plate members upon which the conveyor belt slides in use. The side walls themselves may incorporate longitudinally extending box sections to increase their strength and provide guide rails or feet top and bottom. The side walls preferably extend beyond the bed plates so as to form channels top and bottom in which the conveyor belt runs between the rollers. Sealing strips are preferably provided within the channels to seal the gap between the belt and the sides of the channel. This strip is preferably secured to the side walls and bears down on the outermost surface of the belt.

The frame of the conveyor preferably has a cross-section which is substantially symmetrical about a central transverse axis, and can be used with either run of the conveyor belt uppermost. If required, support legs or scaffolding connectors can be connected to the frame, to support it above the ground. Also, connectors can be provided to interconnect adjacent ends of successive conveyor units, either end-to-end in the same plane, or one above the other with an overhang between them, and/or with the two conveyor units angled relative to one another either vertically or horizontally for a change in conveying direction.

It will be appreciated that whilst the invention has been described in relation to a conveying system comprising a plurality of conveyor units, the invention also consists in an individual conveyor unit having any one or more the features referred to above.

In particular, according to another aspect, the invention consists in a conveyor unit comprising a frame supporting a roller at each end over which a conveyor belt passes in a continuous loop and one of which is driven by a motor, characterised in that the frame comprises a box section structure with upright side walls and lateral walls including an upper bed plate over and along which the conveyor belt slides in use.

DESCRIPTION OF DRAWINGS

The invention will now be described by way of example with reference to the accompanying drawings in which.

MODE OF CARRYING OUT THE INVENTION

Figure 1:
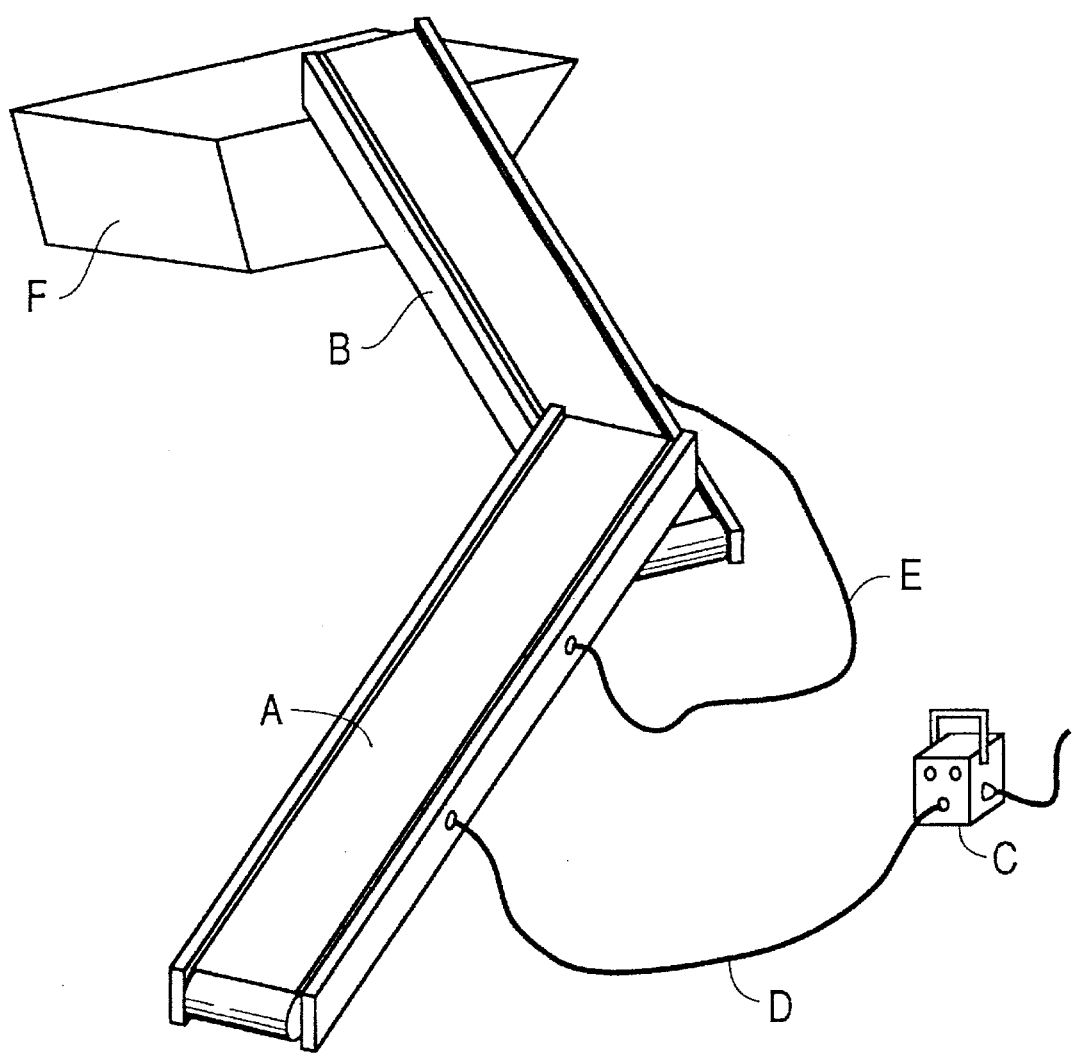
FIG. 1 is a schematic drawing illustrating the principle of a conveying system according to the invention.
Figure 2:
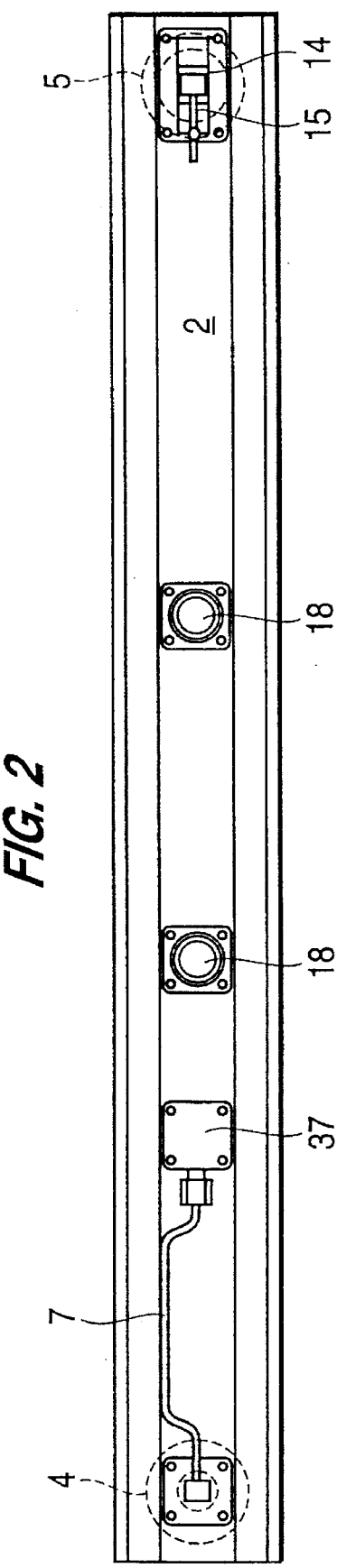
FIG. 2 is a side elevation of a conveyor unit according to the invention.
Figure 3:
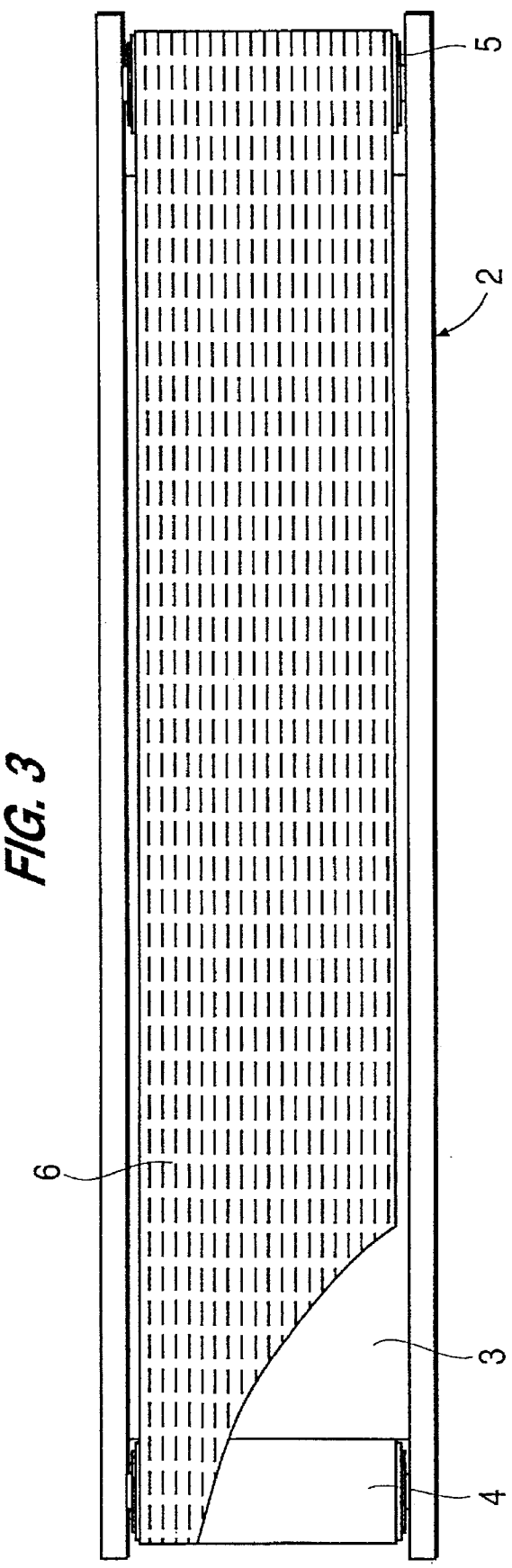
FIG. 3 is a plan view of the conveyor unit of FIG. 2.

The conveying system illustrated in FIG. 1 consists of two portable, electrically driven conveyor units A,B which are powered from a mains powered control unit C via electrical cables D and E. As shown in FIG. 1, the conveyor units A,B are arranged end-to-end with the discharging end of conveyor A overhanging the loading end of conveyor B so as to transport material to a container or skip F.

Figure 4:
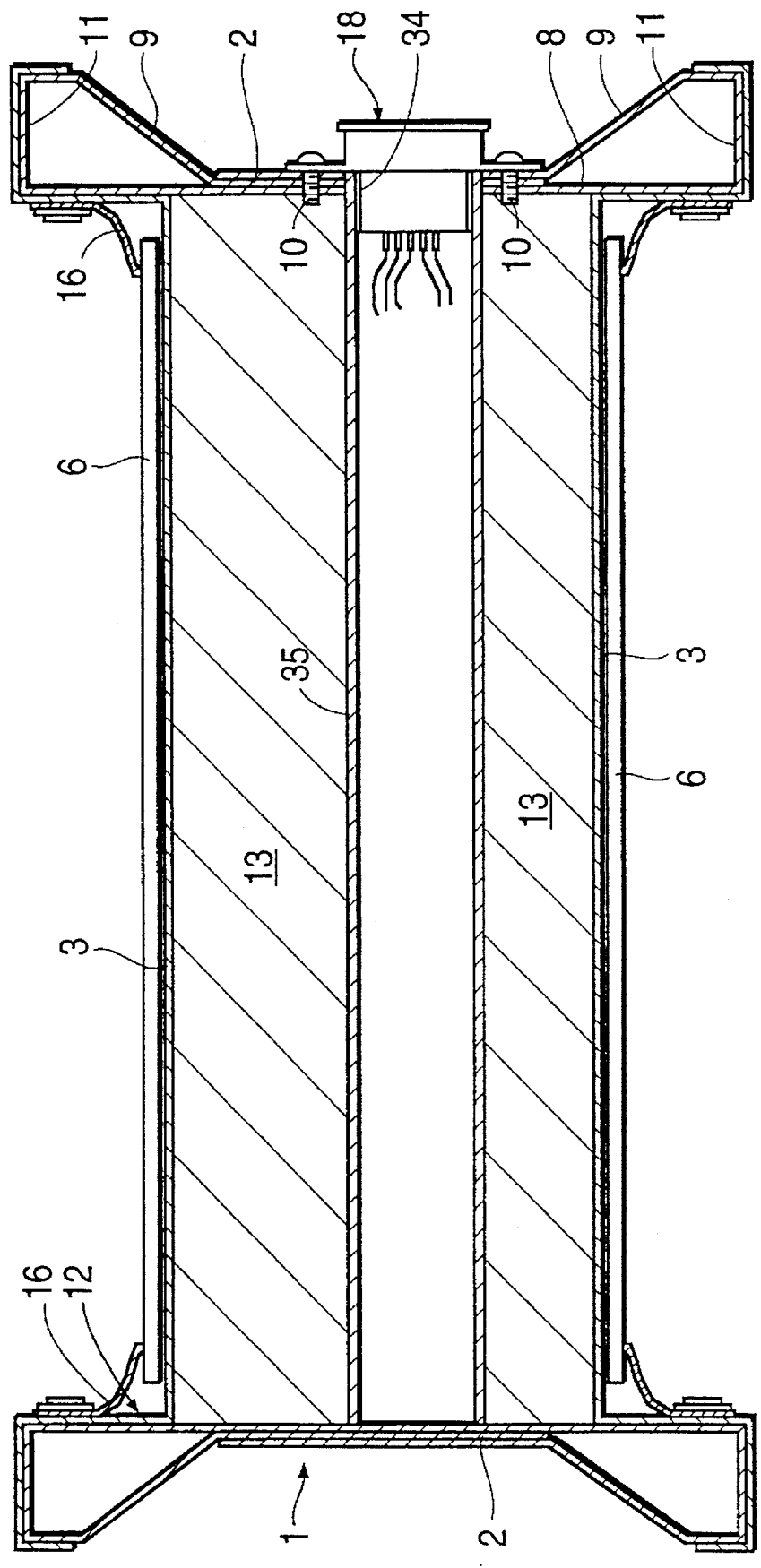
FIG. 4 is a lateral cross-section through the conveyor of FIGS. 1 and 2.

Each conveyor unit A,B comprises a frame 1 which is basically a box-section structure (FIG. 4) comprising upright side walls 2 joined by lateral upper and lower bed plates 3. At each end, the side walls 2 extend longitudinally beyond the bed plates 3 and rotatably support a roller 4,5 therebetween. A conveyor belt 6 extends around both rollers 4,5 and over the outer surfaces of the bed plates 3 so as to be supported on the bed plates when loaded with material to be transported. An electric motor (25 in FIG. 5) and a gearbox are totally enclosed and sealed within the body of one roller 4, and a cable 7 serves to connect power to this electric motor to drive the roller 4.

The side walls 2 comprise two pressed metal components 8,9 which are secured in face-to-face contact by fasteners 10 in their central mid-height region along their whole length. These components 8,9 diverge upwardly and downwardly from their central region, and are connected by web portions 11 at their outer ends so as to form upper and lower box-sections. These box-sections strengthen the frame of the conveyor unit and extend beyond the bed plates 3 so that the web portions 11 form feet at the bottom and side support rails at the top.

Some of the fasteners 10 comprise annular threaded rivets which are secured in aligned holes in the components 8,9 to hold them together, and which provide a threaded connection for the attachment of other components or fittings such as the electrical sockets 18. This same type of fastener is used elsewhere in the frame to connect sheet metal components together and/or to provide threaded connections.

The bed plates 3 are formed from pressed metal components shaped along each side to engage as a close fit over the outer ends of the side walls 2 and to form a channel 12 therebetween in which the conveyor belt 6 is received.

In order to further strengthen the frame 1, structural high-strength foam 13 is injected under pressure into the central void between the side walls 2 and bed plates 3. This foam helps to resist torsion and buckling loads, and to resist impact damage, and to bond the components of the frame together. Also, the foam helps to seal electrical components within the frame, as described hereinafter.

The conveyor belt 6 is of a synthetic solid woven construction, faced and impregnated with a PVC compound, and treated on the back to reduce friction with the bed plates 3. The belt may be a seamless loop or may have joined ends depending upon the working requirements. A raised pattern such as a chevron pattern may be moulded in the case of the belt to assist transport of material, and additional lugs may be fitted to further assist up-hill working. A clearance is provided between the edges of the belt and the sides of the channel 12 in which it is received to allow for belt alignment.

Belt tension is adjusted by mounting the non-driven roller 5 on the side walls 2 via brackets 14 which are longitudinally adjustable by tension screws 15.

Flexible sealing strips 16 are fitted to the sides of the channel 12 and extend inwards and downwards to press against the edge portion of the belt 6, thereby to protect against penetration of material under the belt.

Figure 5:
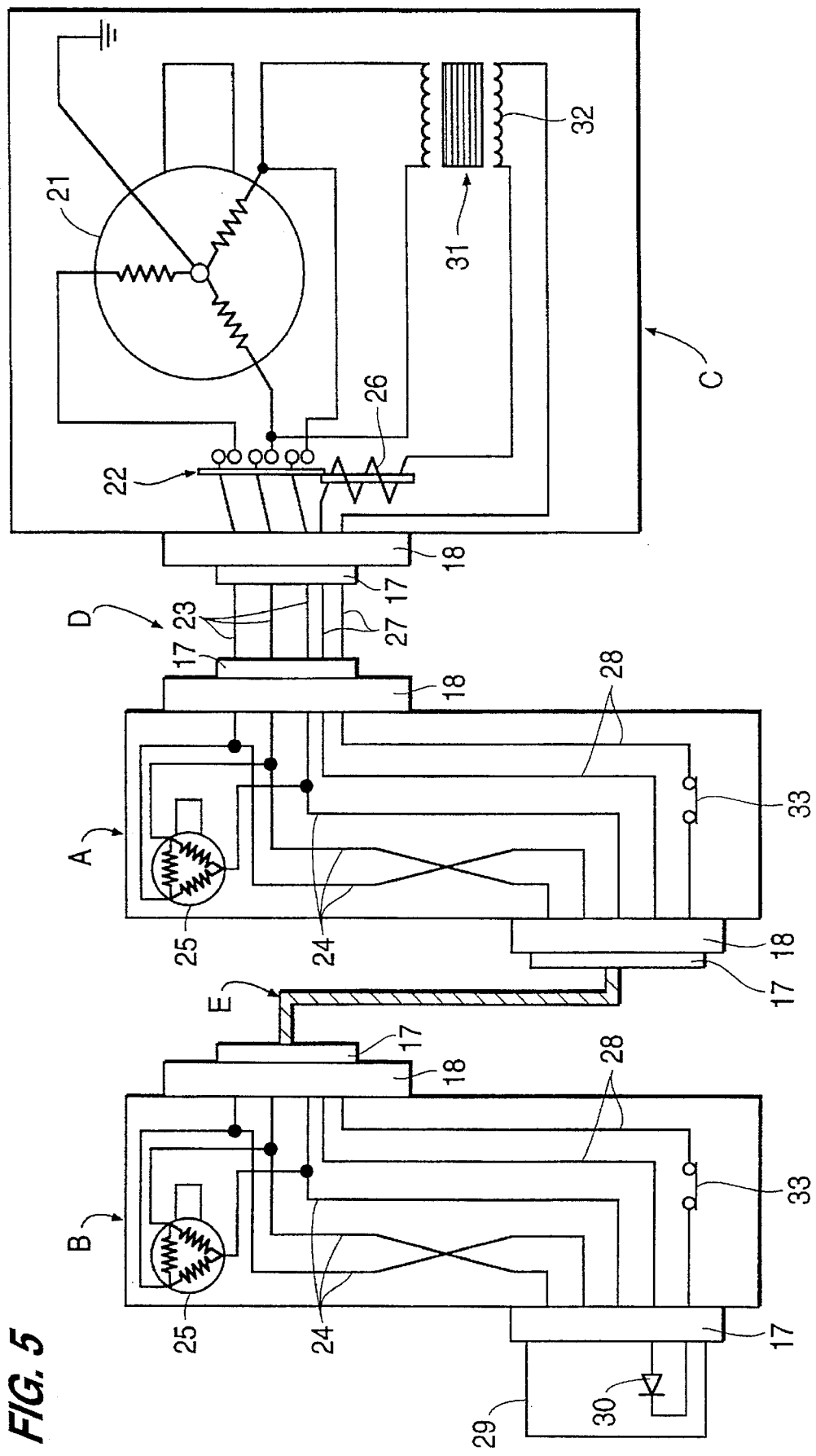
FIG. 5 is part of the power circuit diagram of the conveyor system of FIG. 1.

The electrical cables D and E which connect electrical power to the electric motor 25 in each driven roller 4, are connected to each conveyor unit A,B via a quick-release connector such as a plug and socket connector. A plug 17 is fitted to the end of the cable D,E and engages one or the other of two sockets 18 mounted on the side wall 2 of the conveyor unit. These two sockets are connected to one another and the motor internally of the conveyor unit so that power applied to one socket causes the motor to rotate in one sense, while power applied to the other socket causes the motor to rotate in the other sense. The choice of socket 18 to which a plug 17 is connected therefore determines the sense in which the belt 6 rotates. At the same time, power is transferred internally to the other socket so that this can be used as the power source for the next conveyor unit. Thus, in the system of FIG. 1, the cable D is connected between the power control unit C and a first socket 18 of the first conveyor unit A to cause the belt to rotate in the required sense, and the second socket 18 of the first conveyor unit A is connected via the second cable E to a selected first socket 18 of the second conveyor unit B to cause the belt to rotate in the required sense. The electrical circuit of this arrangement is illustrated in FIG. 5.

The power supply of the control unit C comprises a star connected alternator 21 which supplies a 110 volt three-phase output via a solenoid-operated relay 22 to three power conductors 23 of the cable D. These three power conductors 23 in cable D are connected via sets of matching terminals in the plug and socket connectors 17,18 to three corresponding power conductors 24 within the conveyor unit A which interconnect sets of terminals in the two sockets 17.

The electric motor 25 that drives the roller 4 in each conveyor unit A,B comprises a delta connected three-phase motor, with the three-phase windings connected to respective power conductors 24. Two of the three power conductors 24 are reversed between the respective terminals of the sockets 17 so that the motor 25 will rotate in a different sense depending upon whether the plug 17 of cable D is connected to one socket or the other.

The cable E, like cable D, comprises three power conductors for the three-phase power supply, and these are connected to respective sets of terminals in the plugs 17 at each end. Furthermore, like the first conveyor unit A, the second conveyor unit B has similar internal electric connections between the sockets 18 and the motor 25, so that the three-phase power supply is connected via the three internal power conductors 24 to the motor 25 and the second socket 18.

It will be appreciated that if required, a third or more conveyor units can be connected into the power circuit via the second socket 18 of conveyor unit B and a further cable similar to cable E. Additional conveyor units can be added in a similar manner, each successive unit being interconnected with the preceding unit by a cable.

The solenoid-operated relay 22 in the control unit C controls connection of the three-phase supply to cable D, and has its solenoid 26 connected in a safety circuit which extends as a loop through all of the conveyor units A,B. This safety circuit comprises a pair of safety conductors 27 in each cable D,E, a pair of safety conductors 28 between respective pairs of terminals in the sockets 18, and a terminal plug 29 which is inserted in the non-used socket 18 of the last conveyor unit B in the power circuit. A diode 30 in the terminal plug 29 bridges the pair of safety conductors 28 in the conveyor unit B, and completes a loop circuit through the conductors 27,28 back to the solenoid 26. A low voltage transformer 31 in the control unit C has an output winding 32 which is connected in the loop circuit with the solenoid 26 and produces an alternating voltage. The alternating current is insufficient to energise the solenoid 26, but when the terminal plug 29 is fitted to the last socket 18 to complete the loop circuit, the diode 30 rectifies the alternating current and produces a direct current which is sufficient to energise the solenoid and operate the relay 22. If the loop circuit is subsequently short-circuited or broken by disconnection of any of the plugs 17 or terminal plug 29, the rectified voltage fails and the relay 22 is de-energised and the power supply disconnected.

A thermal overload sensor is also provided in each conveyor unit A,B to control a trip switch 33 in the safety conductor 27 so that overheating of a motor 25 in any of the conveyor units under overload conditions will break the loop circuit via a respective switch 33 and disconnect the power supply to stop all conveyor units.

The sockets 18 are connected to the side wall 2 of the conveyor unit A,B by screws which engage threaded annular rivets 10 in the side wall. Each socket is aligned with a hole 34 in the side wall and a tubular insert 35 that forms an extension of the hole 34 into the frame 1 of the conveyor unit. The insert 35 extends the full width of the frame 1 to the opposite side wall 2 and is supported by the structural foam 13 injected around it. The conductors 24,28 terminate at one end within the insert 35, and are long enough to be connected to the terminals on the rear of the socket 18 before this is fitted in the insert. The conductors 24,28 extend through the side wall of the insert 35, and through the structural foam 13 to a junction box 37 mounted on the side wall 2 of the frame 1. The cable 7 incorporates all of the necessary electrical connections to the motor 25, and is connected into the circuit via the junction box 37.

The materials used in the constructions of each conveyor unit are preferably corrosion resistant. For example, aluminium may be used for the side walls 2, and stainless steel for the bed plates 3. Electrolytic corrosion at the interface between these materials is minimised by the use of powder colour coating on the aluminium and the use of inhibitor fluids during assembly. The rollers 4,5 may comprise stainless steel or nickel plated steel outer cylinders with reinforced plastic end caps.

A conveyor unit as described and illustrated herein may typically be 3000 m.m. long, 382 m.m. wide and 190 m.m. deep, and weigh about 50 kg. It is therefore a relatively lightweight piece of equipment, which can be readily handled manually, and by a single person on their own if needed. This means that the conveyor is readily portable and is suitable for a wide range of applications where material has to be moved.

Furthermore, all of the electrical components are preferably waterproof which makes the conveyor unit safe and allows it to be cleaned by hosing with water while the conveyor is running.

As described above, the power supply is a 110 volt, three-phase supply, but it will be appreciated that other power supplies can be used without departing from the design principles of the illustrated conveyor unit. For example, a single phase power supply could be used, with induction motors to drive the rollers and starter capacitors to assist starting, the starter capacitors being housed within the inserts 35.

As shown in FIG. 1, the conveyor units A and B are simply placed on the ground or skip, or on one another where one delivers material onto the other. However, special fittings may be provided such as legs to support the conveyors or connecting clips to couple successive units together. Also, where conveyor units are simply abutted end-to-end on the same level, additional roller fittings may be provided to fill the gap between them and to allow the two conveyors to be angled relative to one another. Such an arrangement would be more suitable for conveying larger objects such as bricks or blocks.

Also, as illustrated, each conveyor unit A,B can be used either way up, because they are the same top and bottom. However, in an alternative arrangement, the sealing strips 16 on one side are omitted. This might limit the use of this side of the conveyor unit to the transport of objects rather than loose material, but it has the benefit of reducing frictional forces on the belt and reducing manufacturing costs.

I claim:

1. A conveying system comprising:
 a plurality of conveyor units;
 each conveyor unit having a frame supporting a roller at each end over which a conveyor belt passes in a continuous loop;
 at least one of said rollers driven by an electric motor;
 each of said conveyor units moveable relative to the other conveyor unit or units to form a conveyor feed path;
 said electric motors of successive conveyor units interconnected by electrical cables via quick release electrical connectors so that said electric motors are powered and controlled in a common power circuit;
 each conveyor unit further comprising a pair of quick-release electrical connectors, each of said electrical connectors in said pair of electrical connectors connected differently to the electric motor so that the connection of an electrical cable of the common power circuit to one electrical connector causes said electric motor to rotate in one direction, while the connection of the same electrical cable to the other electrical connector causes said electric motor to rotate in the opposite direction.

2. The system as claimed in claim 1 further comprising a single multicore electrical cable connected between successive conveyor units.

3. The system as claimed in claim 2, further comprising a safety circuit formed by said electrical cables, said safety circuit disconnecting power in the common power circuit when any one of said electrical connectors becomes disconnected or a short-circuit occurs while the conveyor units are operating.

4. The system as claimed in claim 2 further comprising:
 a terminal quick-release electrical connector associated with the last of said successive conveyor units; and
 a safety loop circuit extending through each electrical cable, said quick-release electrical connectors, said pair of quick-release electrical connectors and said terminal quick-release electrical connector, said safety loop circuit disconnecting power in the common power circuit when said safety loop circuit is broken or short circuited.

5. The system as claimed in claim 4, said common power circuit comprises a power supply unit connected to a first conveyor unit via a cable and said quick-release electrical connector, successive conveyor units interconnected via successive cables and quick-release connectors, and the last conveyor having said terminal quick-release connector fitted thereto.

6. A conveying system comprising:
 a plurality of conveyor units each having a frame supporting a roller at each end over which a conveyor belt passes in a continuous loop;
 at least one of said rollers driven by an electric motor, each of said conveyor units moveable relative to the other conveyor unit or units to form a conveyor feed path;
 said electric motors of successive conveyor units interconnected by electrical cables via quick release electrical connectors, each of said electric motors powered and controlled in a common power circuit;
 each conveyor unit provided with a pair of quick release electrical connectors, each of said electrical connectors in said pair of electrical connectors connected differently to the electric motor so that the connection of an electrical cable of the common power circuit to one electrical connector causes said electric motor to rotate in one direction, while the connection of the same electrical cable to the other electrical connector causes said electric motor to rotate in the opposite direction.

* * * * *